United States Patent

Ramanujam

[11] Patent Number: 5,967,594
[45] Date of Patent: Oct. 19, 1999

[54] VEHICLE DOOR STRUCTURE AND ARMREST

[75] Inventor: Narayanan Ramanujam, Canton, Mich.

[73] Assignee: Ford Global Technologies, Inc., Dearborn, Mich.

[21] Appl. No.: 09/084,273

[22] Filed: May 26, 1998

[51] Int. Cl.$^6$ ........................................ B60J 9/00
[52] U.S. Cl. .................. 296/153; 280/751; 297/411.21
[58] Field of Search ........................ 296/153; 280/751, 280/753, 752; 297/DIG. 8, 411.37, 411.3, 411.21

[56] References Cited

U.S. PATENT DOCUMENTS

| | | |
|---|---|---|
| 2,922,674 | 1/1960 | Hollerbach . |
| 3,623,768 | 11/1971 | Capener . |
| 3,791,667 | 2/1974 | Haviland . |
| 4,783,114 | 11/1988 | Welch . |
| 4,869,543 | 9/1989 | Grimes . |
| 4,950,023 | 8/1990 | Waller et al. . |
| 5,181,759 | 1/1993 | Doolittle . |
| 5,445,430 | 8/1995 | Nichols ................................ 296/153 |
| 5,527,084 | 6/1996 | Scherf ................................. 296/153 |
| 5,549,327 | 8/1996 | Rusche et al. ....................... 280/751 |
| 5,816,645 | 10/1998 | Grimes ................................ 296/153 |
| 5,904,370 | 5/1999 | Steiner et al. ...................... 280/753 X |

FOREIGN PATENT DOCUMENTS

| | | |
|---|---|---|
| 2691414 | 11/1993 | France ................................ 296/153 |
| 59-53271 | 3/1984 | Japan . |
| 2-290749 | 11/1990 | Japan . |
| 3-92446 | 4/1991 | Japan . |

*Primary Examiner*—D. Glenn Dayoan
*Assistant Examiner*—Jason Morrow
*Attorney, Agent, or Firm*—Raymond L. Coppiellie

[57] ABSTRACT

There is disclosed a vehicle door structure for an automotive vehicle comprising a door including an outer panel and an inner panel attached together to define a door cavity therebetween. An armrest secured to the door inner panel includes an inner cavity and is collapsible against the door inner panel upon the imposition of a predetermined level of force against the armrest. The armrest also includes an inflatable airpad in the inner cavity for receiving and venting a volume of air therein. The airpad includes an outlet aperture in fluid communication with the door cavity and an inlet aperture in fluid communication with a source of compressed air disposed remotely from the door. The armrest is collapsibly and retractably secured to the door such that the armrest projects into the vehicle when the door is closed and is retracted against the door when the door is open.

15 Claims, 3 Drawing Sheets

VEHICLE DOOR STRUCTURE AND ARMREST

BACKGROUND OF THE INVENTION

1. Field of the Invention

The present invention relates generally to a door structure for an automotive vehicle. More particularly, the present invention relates to a vehicle door structure having a collapsible and retractable armrest.

2. Disclosure Information

It is well known in motor vehicles to provide a decorative door trim panel assembly on the inner panel of the door facing the passenger compartment of the vehicle cabin. It is also well known to provide an armrest on the door which projects inwardly into the passenger cabin from the door trim panel to provide a convenient rest for the occupant's arm. In an effort to make vehicle interiors more modular, an increasing amount of molded plastic door trim panels are being utilized. These molded door trim panels typically include an armrest molded integrally with the trim panel. While functioning adequately as a resting place for the occupant's arm, these hard plastic armrests can become uncomfortable during a long ride. Furthermore, when a vehicle occupant enters or exits the vehicle, the door is open and the armrest projects outwardly from it. Persons entering or exiting the vehicle often bump against the armrest. It would therefore be desirable to provide an armrest which is more comfortable and is retractable so as not to interfere with the ingress and egress of passengers from the vehicle.

When the vehicle door is closed, the armrest extends into the passenger cabin. It is known that the door trim panel and armrest may be comprised of a foam material which collapses and absorbs energy upon imposition of a lateral force against it. The prior art also recognizes that an armrest may be comprised of a foam or honeycomb structure which will yield laterally when a force is applied against it. However, these types of armrests do not retract to ease the ingress or egress of vehicle occupants. It would also be desirable to provide a vehicle door with an armrest that provides some lateral cushioning when a force is applied against it and which does not interfere with occupant entry and exit to and from the vehicle.

It is an object of the present invention to provide a vehicle door structure having a comfortable armrest which is both collapsible under a force and which is retractable when the vehicle door opens.

It is a feature of the present invention to provide an armrest which is inflatable upon closing of the vehicle door and which remains inflated until either a lateral force compresses the air from it or the vehicle door is opened.

SUMMARY OF THE INVENTION

The present invention overcomes the problems and disadvantages of prior art designs by providing a vehicle door structure for an automotive vehicle comprising a door including an outer panel and an inner panel attached together to define a door cavity therebetween. An armrest secured to the door inner panel includes an inner cavity and is collapsible against the door inner panel upon the imposition of a predetermined level of force against the armrest. The armrest also includes an inflatable airpad in the inner cavity for receiving and venting a volume of air therein. The airpad includes an outlet aperture in fluid communication with the door cavity and an inlet aperture in fluid communication with a source of compressed air disposed remotely from the door. The armrest further includes an outlet valve member disposed in the door inner panel in communication with the outlet aperture of the airpad. The outlet valve member is operative to open and deflate the airpad under the imposition of a predetermined level of force upon the armrest or when the vehicle door is moved from a closed position to an open position. The armrest further includes guide means for retractably extending the armrest into the vehicle when the door is closed and retracting against the door when the door is open. The guide means comprises a slide mechanism having a fixed member, a movable member secured to the fixed member for reciprocating movement therealong, and a spring member disposed between the movable member and an inner surface of the armrest. The spring member urges the moveable member toward the door inner panel upon deflation of the airpad.

It is an advantage of the present invention that a more comfortable armrest assembly can be utilized which maximizes the interior space of a vehicle when the vehicle doors are open. These and other features, objects and advantages of the present invention will be apparent from the drawings, detailed description and claims which follow.

DETAILED DESCRIPTION OF THE PREFERRED EMBODIMENTS

Figure 1:
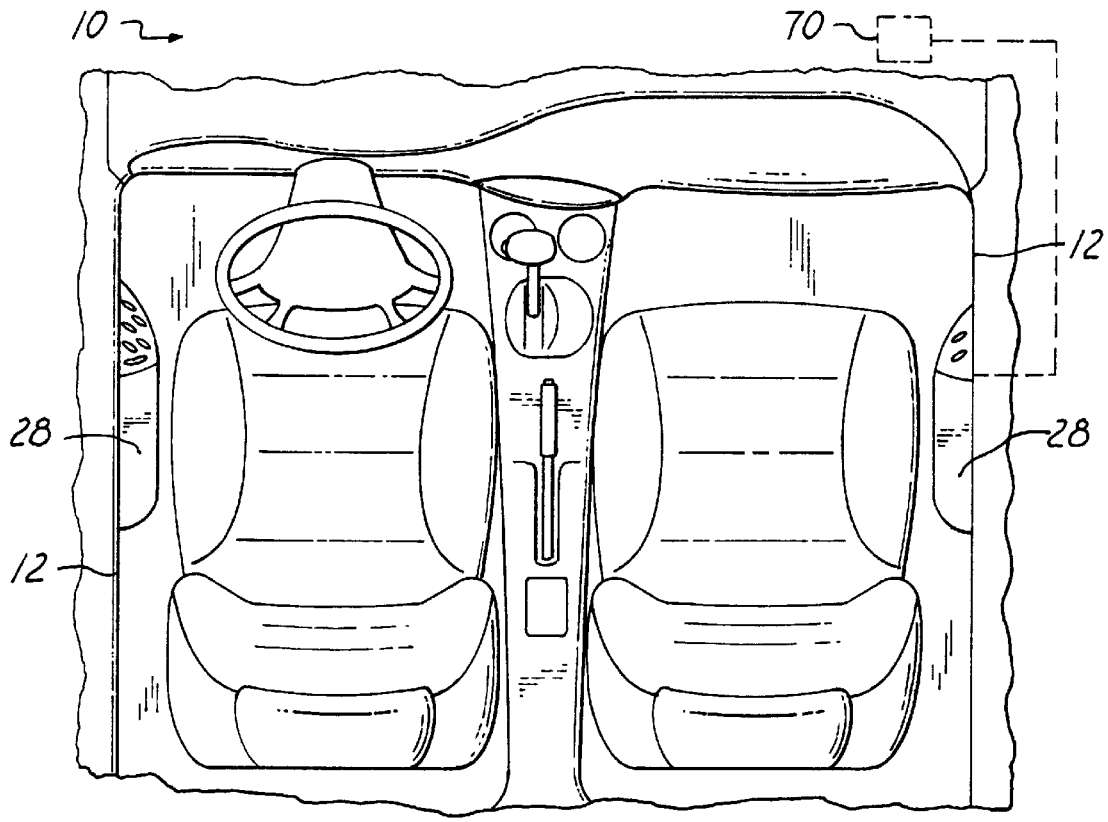
FIG. 1 is a top plan view of an automotive vehicle having a door structured in accord with the principles of the present invention.
Figure 3:
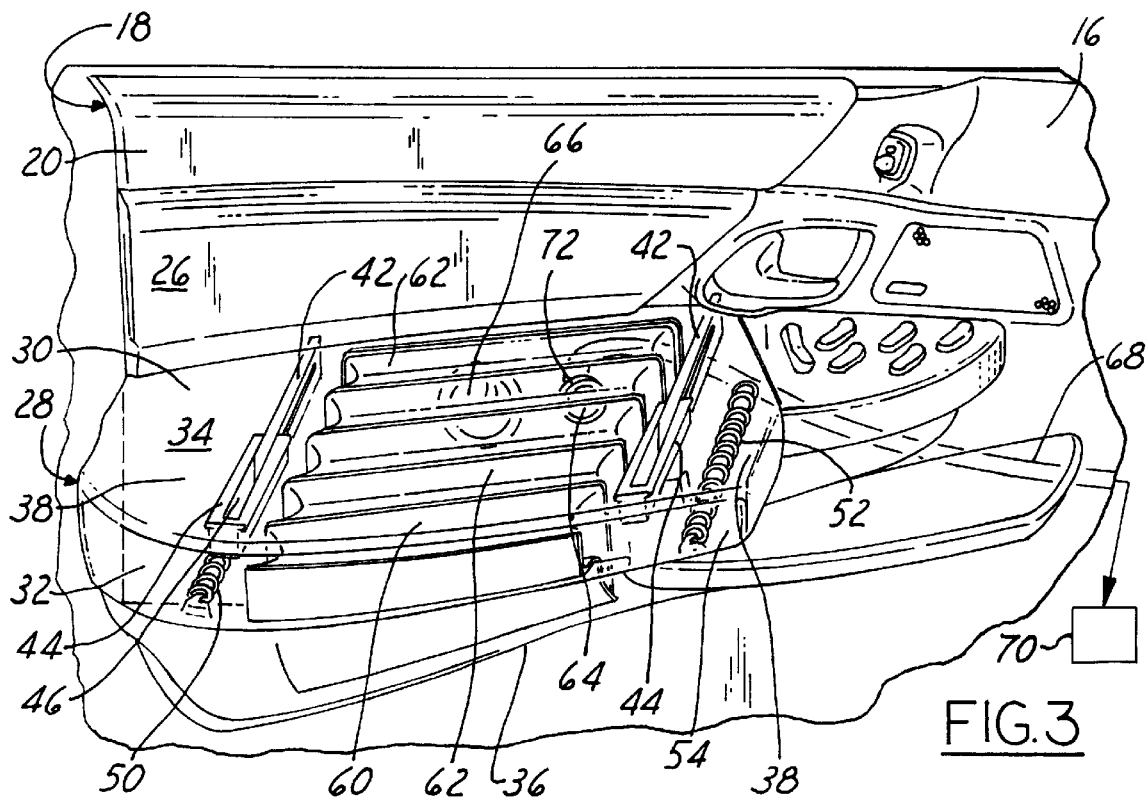
FIG. 3 is a perspective view of a vehicle door structure of the present invention in a first position with an armrest inflated.
Figure 2:
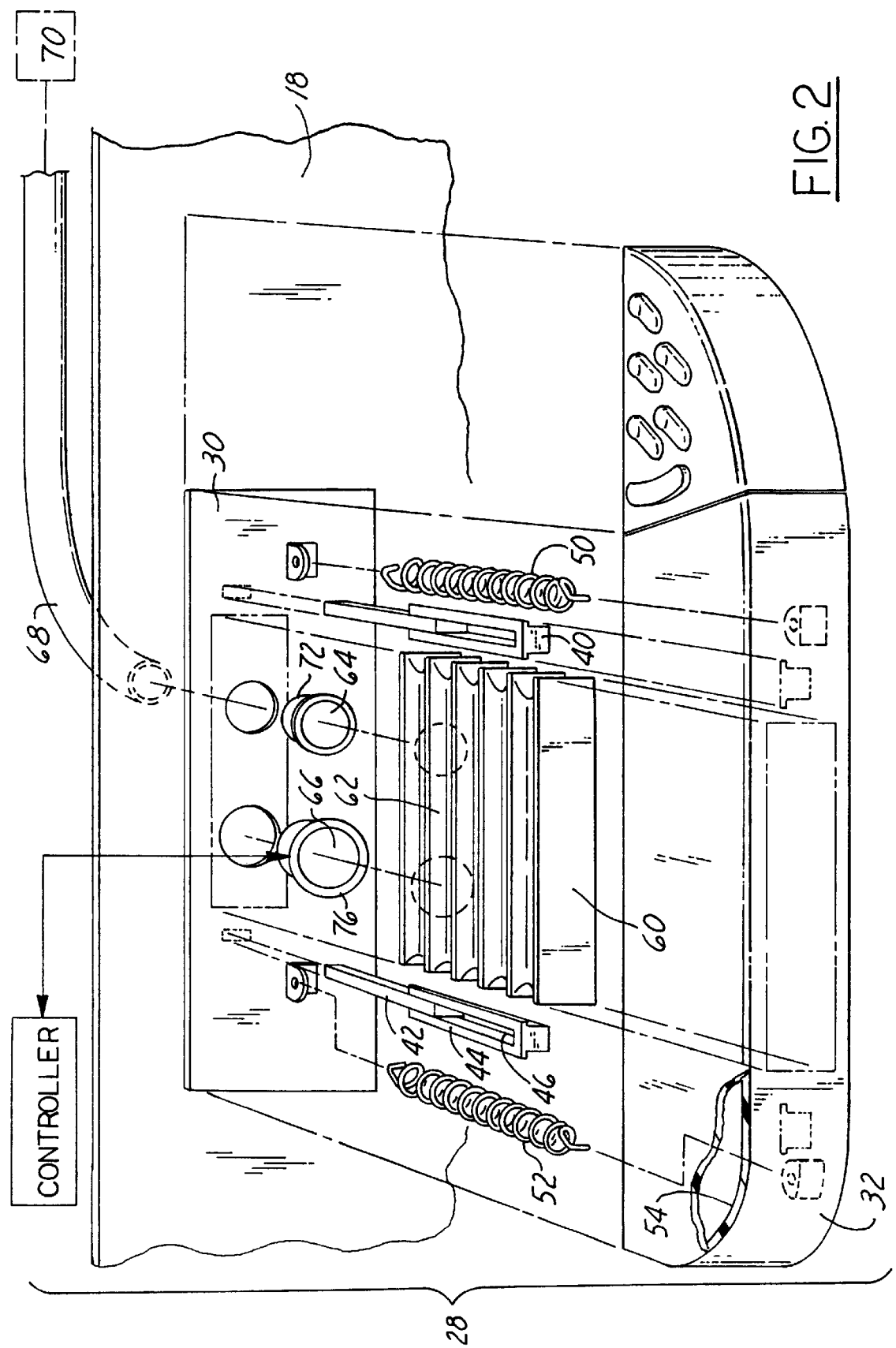
FIG. 2 is an exploded view of an automotive vehicle door structured in accord with the principles of the present invention.
Figure 4:
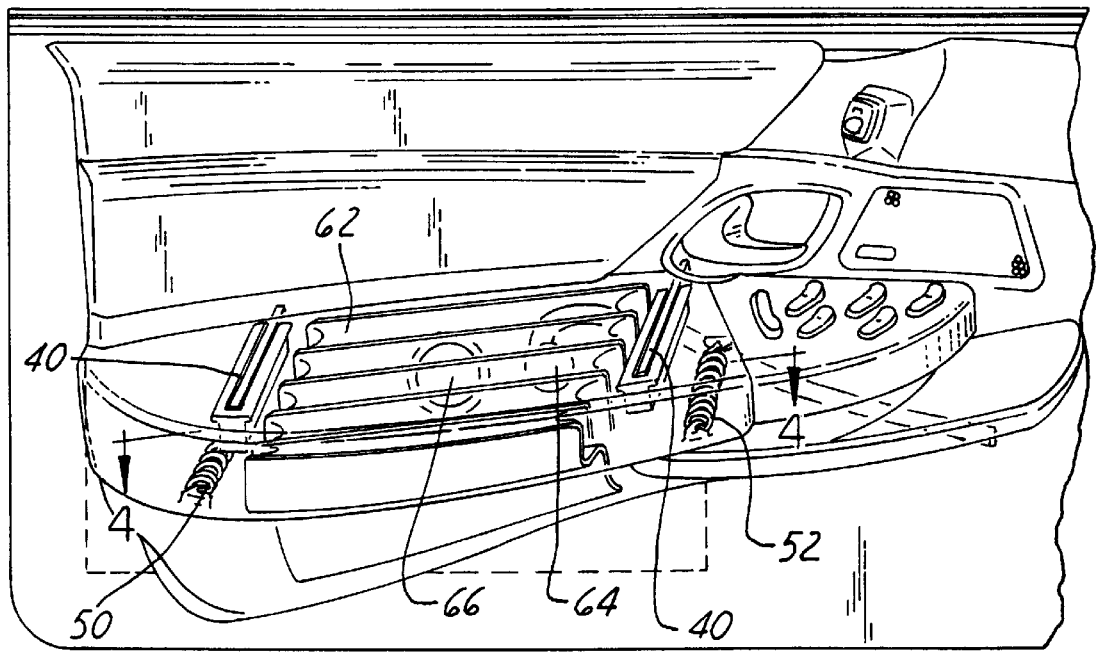
FIG. 4 is a perspective view of a vehicle door structure of the present invention in an second position with an armrest in a retracted position.
Figure 5:
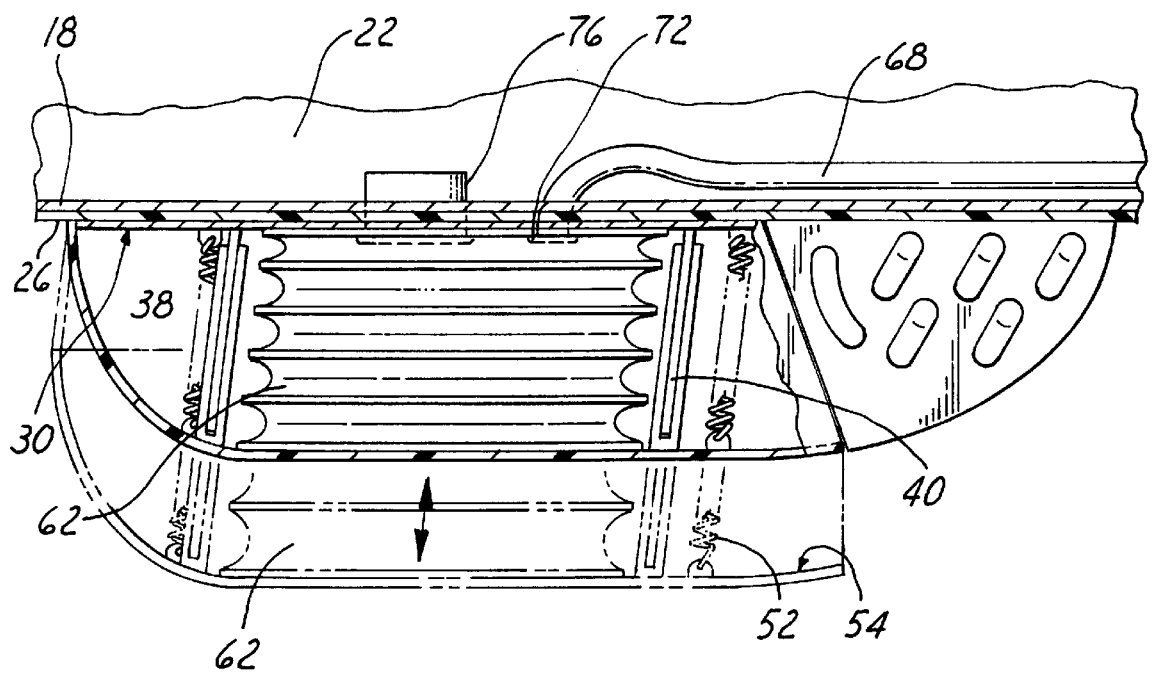
FIG. 5 is a top plan view of the vehicle door structure of the present invention showing the armrest in both an inflated (dotted lines) and deflated (solid lines) positions.

Referring now to the drawings, FIG. 1 shows an automotive vehicle 10 having a set of front doors 12 and possibly rear doors (not shown). The vehicle 10 includes a full complement of sensors (not shown) such as a sensor for determining whether the vehicle is; "on", whether the vehicle doors are open or closed, and whether the ignition switch is being activated or deactivated. These types of sensors are commonly known and used in the automotive industry. For ease of simplification, only one of the doors will be described here, it being understood that the remaining doors are structured identically except for slight modifications for right/left sides and front/rear requirements. As shown more clearly in FIGS. 2–5, the vehicle door structure 16 includes an outer panel 18 and an inner door panel 20 which are attached together in spaced apart relationship by known techniques, such as by welding and hem flanging the peripheral flanges. A space 22 is formed between the outer panel 18 and inner panel 20 which provides a storage space for the window panel and window regulator (not shown) as well as for a fluid communication tube which will be described in greater detail below.

The inner panel 18 is concealed by a door trim panel 26. An armrest 28 is secured to the trim panel 26. The armrest 28 is fabricated from a flexible, synthetic, polymeric material and includes a backing plate 30 for attachment to the door inner panel 20, an inboard side 32, a top 34 and a bottom 36. The armrest 28 is generally hollow and defines an inner cavity 33. Armrest guides 40 are disposed in the cavity 38 and extend outwardly from backing plate 30 so as to project inboard into the vehicle passenger cabin. The armrest guides 40 serve to provide a rigid, but retractable structure to the flexible armrest 28. The guides 40 comprise an elongated fixed member 42 secured to the backing plate 30 and a movable member 44. The movable member includes a channel 46 into which the fixed member 42 is seated such that the movable member 44 can slide reciprocally about the fixed member 42 in a direction generally perpendicularly to the longitudinal axis of the vehicle (or into the passenger cabin). A spring member 50 can be fitted over the inboard end of the fixed member 42 or secured with the cavity adjacent the guide 40 as shown by spring 52. One end of spring 52 is secured to backing plate 30 while the opposite end is secured to an inner surface 54 of the armrest in the inner cavity 38. The spring members 50, 52 provide a biasing force to urge the guides 40 and inboard end 32 of the armrest toward the vehicle door panels.

An airpad 60 disposed with armrest cavity comprises a plurality of generally elongate, inflatable chambers 62. The chambers 62 are arranged with their longitudinal axis generally parallel to the longitudinal axis of the vehicle. The chambers 62, when deflated, fold in an accordion-like or bellows-like fashion to minimize the amount space extending into the vehicle. The airpad 60 further includes an inlet aperture 64 and an outlet aperture 66. The inlet aperture 64 communicates fluidly through tubing 68 with a source of compressed air, such as a compressor 70, disposed remotely from the vehicle door. It is anticipated that the vehicle will include an auxiliary air compressor 70 such as used for filling a lumbar support or air adjustable suspension units. The tubing 68 is stored in the door cavity as explained above and is secured to a filling collar 72 formed or secured to backing plate 30. It will be apparent that airpad 60 includes a sealing mechanism surrounding inlet aperture 64 such that no leakage of air occurs therethrough, either during filling or while filled. When fully inflated, the airpad 60 biases against the spring members 50, 52 to extend the armrest inwardly into the vehicle passenger cabin.

The airpad 60 also includes an outlet aperture 66 fluidly communicating with an outlet valve 76 formed in backing plate 30. A sealing collar is similarly formed between the outlet aperture 66 of airpad 60 and the valve 76. Valve 76 provides an exit for the air contained within the airpad 60. The air is released from the airpad 60 through the valve 76 in two situations: first, when a lateral force is applied against armrest 28, such as when a vehicle occupant is forced into the armrest, the valve 76 opens when the pressure in the inflated airpad 60 exceeds a predetermined threshold, and secondly, when the vehicle door is opened. The valve 76 can be mechanically constructed to open only under this predetermined pressure or it can be electrically controlled and opened when given a signal by a controller. In the embodiment where a controller is utilized, a pressure sensor is also included in the airpad 60 to measure the pressure and ultimately open the valve 76 when the predetermined pressure is reached. This provides a cushioning effect when a vehicle occupant is forced into the armrest or the armrest is forcibly pushed into the occupant.

In use, the armrest 28 of the present invention is collapsibly and retractably mounted relative to the door inner panel. In a normal state where the vehicle is running and an occupant is in the vehicle, the armrest 28 is fully inflated by the compressor. Full inflation provides a comfortable rest location for the occupant's arm. If the vehicle is turned off, or if the vehicle door is opened (as determined by a sensor located in the door or by a switch in the door handle, such as commonly used for turning on interior vehicle lights), the outlet valve 76 in the backing plate 30 of the armrest opens, allowing the airpad 60 to deflate. The spring members 52, 54 pull the inboard end of the armrest toward the vehicle door inner panel. The deflated armrest provides more room for occupant ingress and egress to and from the vehicle. The occupant will not bump into the armrest while entering or exiting the vehicle. When the occupant enters the vehicle and the vehicle is running (as determined by appropriate ignition sensors) and the door is closed as determined by another sensor commonly used in the automotive industry, the compressor operates and begins filling the airpad 60. Once the airpad 60 is full, the compressor is turned off.

During vehicle operation, a vehicle occupant may be forcibly pushed into the armrest 28. If this happens and the force of the occupant into the armrest exceeds a predetermined threshold, the valve 76 will open fully and immediately deflate the airpad 60, causing the armrest to collapse. As explained above, this provides some cushioning effect for the occupant by absorbing some energy prior to deflation.

With a door structure of this design, more interior room is available when the armrests are not deployed. The armrests also provide some energy absorbing features with a relatively inexpensive system. It will, no doubt, become apparent to those skilled in the art that various modifications and alterations to the present invention can be made. For example, the armrest can be secured to the door trim panel by either fasteners or adhesive. The armrest can be manufactured as a separate unit and secured to the door as such. Alternatively, components of the armrest can be made integrally with the inner door panel or door trim panel. It is the following claims, including all equivalents, which define the scope of my invention.

What is claimed is:

1. A vehicle door structure, comprising:
   a door including an outer panel and an inner panel attached together and defining a door cavity therebetween;
   an armrest secured to said door inner panel, said armrest defining an inner cavity and being collapsible against said door inner panel upon the imposition of a predetermined level of force against the armrest;
   an inflatable airpad for receiving and venting a volume of air therein, said airpad being disposed in said inner cavity of said armrest and having an outlet aperture in fluid communication with said door cavity and an inlet aperture in fluid communication with a source of compressed air disposed remotely from said door; and
   guide means for retractably extending the armrest such that said armrest projects into said vehicle when said door is in a first position and said armrest is retracted against said door when said door is in a second position.

2. A vehicle door structure according to claim 1, wherein said guide means for retractably extending comprises a slide mechanism having a fixed member secured to a backing plate in said inner cavity of said armrest and a movable member secured to said fixed member for reciprocating movement therealong.

3. A vehicle door structure according to claim 2, wherein said guide means further includes a spring member disposed between said movable member and an inner surface of said armrest, said spring member being operative to urge said moveable member toward said door inner panel upon deflation of said airpad.

4. A vehicle door structure according to claim 3, wherein said guide means is disposed in said inner cavity of said armrest.

5. A vehicle door structure according to claim 1, further including an outlet valve member disposed in said door inner panel in communication with said outlet aperture of said airpad, said outlet valve member being operative to open and deflate said airpad under the imposition of a predetermined level of lateral force against said armrest.

6. A vehicle door structure according to claim 5, wherein said outlet valve is further operative to open and deflate said airpad when said vehicle door is moved from a closed position to an open position.

7. A vehicle door structure according to claim 1, wherein said source of compressed air is an air compressor.

8. A vehicle door structure according to claim 7, wherein said inlet aperture of said airpad is fluidly connected to said compressor such that when said vehicle door is closed, said compressor is operative to inflate said airpad.

9. A vehicle door structure according to claim 1, wherein said armrest is manufactured from a flexible material.

10. A vehicle door structure according to claim 1, wherein said airpad is a bellows shaped member having a plurality of elongated chambers configured to fold upon one another in an accordion-like fashion upon deflation of said airpad.

11. A vehicle door structure, comprising:
   a door including an outer panel and an inner panel attached together and defining a door cavity therebetween;
   an armrest secured to said door inner panel, said armrest defining an inner cavity and being collapsible against said door inner panel upon the imposition of a predetermined level of force against the armrest;
   an inflatable airpad for receiving and venting a volume of air therein, said airpad being disposed in said inner cavity of said armrest and having an outlet aperture in fluid communication with said door cavity and an inlet aperture in fluid communication with a source of compressed air disposed remotely from said door;
   an outlet valve member disposed in said door inner panel in communication with said outlet aperture of said airpad, said outlet valve member being operative to open and deflate said airpad under the imposition of a predetermined level of force upon said armrest and deflate said airpad when said vehicle door is moved from a closed position to an open position; and
   a pair of armrest guides operative to retractably extend the armrest into said vehicle when said door is in a first position and retract said armrest against said door when said door is in a second position, each one of said pair of armrest guides comprising a slide mechanism having a fixed member secured to said door inner panel, a movable member secured to said fixed member for reciprocating movement therealong, and a spring member disposed between said movable member and an inner surface of said armrest, said spring member being operative to urge said moveable member toward said door inner panel upon deflation of said airpad.

12. A vehicle door structure according to claim 11, wherein said source of compressed air is an air compressor.

13. A vehicle door structure according to claim 12, wherein said inlet aperture of said a airpad is fluidly connected to said compressor such that when said vehicle door is closed, said compressor is operative to inflate said airpad.

14. A vehicle door structure according to claim 11, wherein said armrest is manufactured from a flexible material.

15. A collapsible and retractable armrest for a door structure of an automotive vehicle, the vehicle having an air compressor disposed therein which supplies compressed air when said vehicle is running, the door structure having a door inner panel secured to a door outer panel and defining a door cavity therebetween, said armrest comprising:
   an inflatable airpad for receiving and venting a volume of air therein, said airpad being disposed in an inner cavity of said armrest and having an outlet aperture in fluid communication with said door cavity and an inlet aperture in fluid communication with said air compressor disposed remotely from said door;
   an outlet valve member disposed in said door inner panel in communication with said outlet aperture of said airpad, said outlet valve member being operative to open and deflate said airpad under the imposition of a predetermined level of force upon said armrest or when said vehicle door is moved from a closed position to an open position; and
   a pair of guide members disposed in said armrest inner cavity for retractably extending the armrest into said vehicle when said door is in a closed position and retracting said armrest against said door when said door is in an open position, each one of said pair of armrest guides comprising a slide mechanism having a fixed member secured to said door inner panel, a movable member secured to said fixed member for reciprocating movement therealong, and a spring member disposed between said movable member and an inner surface of said armrest, said spring member being operative to urge said moveable member toward said door inner panel upon deflation of said airpad.

* * * * *